United States Patent
Middlebrooks (10) Patent No.: US 7,502,715 B1
(45) Date of Patent: Mar. 10, 2009

(54) OBSERVABILITY IN METROLOGY MEASUREMENTS

(75) Inventor: Scott A. Middlebrooks, Sandy, OR (US)

(73) Assignee: ASML Netherlands B.V, Veldhoven (NL)

( * ) Notice: Subject to any disclaimer, the term of this patent is extended or adjusted under 35 U.S.C. 154(b) by 0 days.

(21) Appl. No.: 11/233,527

(22) Filed: Sep. 21, 2005

Related U.S. Application Data (60) Provisional application No. 60/611,826, filed on Sep. 21, 2004.

(51) Int. Cl.
*G06F 11/30* (2006.01)
*G05B 13/02* (2006.01)

(52) U.S. Cl. .......................................... 702/182; 700/31

(58) Field of Classification Search .................. 702/182, 702/196, 108, 179, 188–190; 703/2, 22, 703/13; 700/108, 52, 28–29, 31; 438/14
See application file for complete search history.

(56) References Cited

U.S. PATENT DOCUMENTS

| | | | |
|---|---|---|---|
| 5,402,367 A * | 3/1995 | Sullivan et al. ................ 703/6 |
| 5,519,605 A * | 5/1996 | Cawlfield .................... 700/31 |
| 5,711,843 A * | 1/1998 | Jahns .................... 156/345.24 |
| 6,230,069 B1 * | 5/2001 | Campbell et al. ........... 700/121 |
| 6,263,355 B1 * | 7/2001 | Harrell et al. ............... 708/320 |
| 6,285,971 B1 * | 9/2001 | Shah et al. ..................... 703/2 |
| 6,373,033 B1 * | 4/2002 | de Waard et al. ............ 219/497 |
| 6,718,224 B2 * | 4/2004 | Firth et al. .................. 700/121 |
| 6,725,098 B2 * | 4/2004 | Edwards et al. ............... 700/31 |
| 6,738,677 B2 * | 5/2004 | Martin et al. ................ 700/44 |
| 6,738,682 B1 * | 5/2004 | Pasadyn .................... 700/100 |
| 6,748,280 B1 * | 6/2004 | Zou et al. ..................... 700/31 |
| 6,757,579 B1 * | 6/2004 | Pasadyn .................... 700/108 |
| 6,766,214 B1 * | 7/2004 | Wang et al. ................. 700/121 |
| 6,826,521 B1 * | 11/2004 | Hess et al. .................... 703/12 |
| 6,988,017 B2 * | 1/2006 | Pasadyn et al. ............. 700/121 |
| 7,006,900 B2 * | 2/2006 | Zhenduo et al. ............. 700/299 |
| 7,092,863 B2 * | 8/2006 | Goldman et al. ............... 703/2 |
| 7,330,804 B2 * | 2/2008 | Turner et al. ................... 703/2 |
| 7,376,472 B2 * | 5/2008 | Wojsznis et al. .............. 700/29 |
| 2004/0167655 A1 * | 8/2004 | Middlebrooks et al. ..... 700/121 |
| 2005/0187643 A1 * | 8/2005 | Sayyar-Rodsari et al. ..... 700/29 |
| 2005/0209714 A1 * | 9/2005 | Rawlings et al. ............. 700/29 |

OTHER PUBLICATIONS

Muske, K., Linear Model predictive Control of Chemical Processes, Univ. of Texas at Austin, May 1995.*
Waller, J., Concept and Methodologies in Non-Linear Model Predictive Control, Jan. 26, 2000.*
Dougherty et al., A Practice Multiple Model Adaptive Stategy for Multivariable Model Predictive Control, 2003, Control Engineering Practice, pp. 649-664.*
Middlebrooks, Scott Anderson. "Modelling and Control of Silicon and Germanium Thin Film Chemical Vapor Deposition," Diss. U of Wisconsin-Madison, 2001. pp. 42-43.

* cited by examiner

*Primary Examiner*—Michael P. Nghiem
*Assistant Examiner*—Toan M Le
(74) *Attorney, Agent, or Firm*—Sterne, Kessler, Goldstein & Fox P.L.L.C.

(57) ABSTRACT

Evaluating the observability of a system includes determining an output measurement scheme, and based on the output measurement scheme, quantifying the ability of the output measurement scheme to provide information about a state of the system by producing an observability value that gauges the ability. In one embodiment, a matrix transformation of the observability matrix may be used to quantify the observability of the states.

11 Claims, 12 Drawing Sheets

| | True State | Observability | Inferred State |
|---|---|---|---|
| $x_1$ | 1 | 100% | 1 |
| $x_2$ | 0 | 58% | -0.11 |
| $x_3$ | -1 | 58% | -0.11 |
| $x_4$ | 0.67 | 58% | -0.11 |

| | True State | Observability | Inferred State |
|---|---|---|---|
| $x_1$ | 1 | 100% | 1.06 |
| $x_2$ | 0 | 93% | -0.39 |
| $x_3$ | -1 | 64% | -0.19 |
| $x_4$ | 0.67 | 86% | 0.13 |

| | True State | Observability | Inferred State |
|---|---|---|---|
| $x_1$ | 1 | 100% | 1.0 |
| $x_2$ | 0 | 100% | 0 |
| $x_3$ | -1 | 100% | -1.0 |
| $x_4$ | 0.67 | 100% | 0.67 |

|  | True State |
|---|---|
| $T_x$ (nm) | 20 |
| $T_y$ (nm) | -40 |
| $S_x$ (ppm) | 0.5 |
| $S_y$ (ppm) | -0.45 |
| $g_{rot}$ (μrads) | 0.3 |
| $g_{nonorth}$ (μrads) | -0.25 |

| | True State | Observability | Inferred State |
|---|---|---|---|
| $T_x$ (nm) | 20 | 100% | 20 |
| $T_y$ (nm) | -40 | 100% | -40 |
| $S_x$ (ppm) | 0.5 | 0% | 0 |
| $S_y$ (ppm) | -0.45 | 0% | 0 |
| $g_{rot}$ (μrads) | 0.3 | 0% | 0 |
| $g_{nonorth}$ (μrads) | -0.25 | 0% | 0 |

| | True State | Observability | Inferred State |
|---|---|---|---|
| $T_x$ (nm) | 20 | 100% | 20 |
| $T_y$ (nm) | -40 | 100% | -40 |
| $S_x$ (ppm) | 0.5 | 80% | 0.34 |
| $S_y$ (ppm) | -0.45 | 54% | 0.1 |
| $g_{rot}$ (μrads) | 0.3 | 87% | -0.02 |
| $g_{nonorth}$ (μrads) | -0.25 | 49% | -0.2 |

| | True State | Observability | Inferred State |
|---|---|---|---|
| $T_x$ (nm) | 20 | 100% | 20 |
| $T_y$ (nm) | -40 | 100% | -40 |
| $S_x$ (ppm) | 0.5 | 80% | 0.34 |
| $S_y$ (ppm) | -0.45 | 54% | 0.1 |
| $g_{rot}$ (μrads) | 0.3 | 87% | -0.02 |
| $g_{nonorth}$ (μrads) | -0.25 | 49% | -0.2 |

| | True State | Observability | Inferred State |
|---|---|---|---|
| $T_x$ (nm) | 20 | 100% | 20 |
| $T_y$ (nm) | -40 | 100% | -40 |
| $S_x$ (ppm) | 0.5 | 100% | 0.5 |
| $S_y$ (ppm) | -0.45 | 100% | -0.45 |
| $g_{rot}$ (μrads) | 0.3 | 100% | 0.3 |
| $g_{nonorth}$ (μrads) | -0.25 | 100% | -0.25 |

FIG. 5K

OBSERVABILITY IN METROLOGY MEASUREMENTS

CROSS REFERENCE TO OTHER APPLICATIONS

This application claims priority to U.S. Provisional Patent Application No. 60/611,826 entitled OBSERVABILITY MATRIX IN METROLOGY MEASUREMENT filed Sep. 21, 2004 which is incorporated herein by reference for all purposes.

BACKGROUND OF THE INVENTION

Metrology measurements are used in many environments for controlling system processes. For example, in semiconductor manufacturing environments, metrology measurements are frequently used to confirm that products are defect free and that the process is operating within the specified parameters. Sometimes such measurements are also used as an output feedback signal for model-predictive control algorithms that regulate the process.

In a typical semiconductor manufacturing environment, metrology measurements are made across the wafer randomly. The randomly selected measurement points are usually somewhat correlated, therefore they provide redundant information. Stated another way, it is possible to obtain the same amount of information without requiring as many measurements. Since metrology measurements are often expensive to make, it would be useful to have a way of obtaining metrology measurements that contains (or, as used throughout this specification, observes) more information with a smaller number of measurements.

BRIEF DESCRIPTION OF THE DRAWINGS

Various embodiments of the invention are disclosed in the following detailed description and the accompanying drawings.

FIGS. 5A-5K are diagrams illustrating another example of evaluating observability based on various measurement schemes.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Evaluating the observability of a system is disclosed. A system can typically by characterized by a set of information referred to as its states, which typically have some correspondence with the inputs. It is common for a system to have states that can be inferred but not directly measured. Observability measures how well the states of a system can be inferred based on its output measurements. A system is observable when it is possible to establish, in a finite interval of time, the time history of the vector x given the time history of the output vector y over the same interval. In some embodiments, one or more output measurements are obtained according to a measurement scheme. As used herein, a measurement scheme refers to a specific way of obtaining a set of measurements. A measurement scheme is characterized by, for example, the design, behavior, and placement of the sensors used to make the measurement samples, the time and frequency of measurement samples, or any other appropriated factors that may affect the measurements taken. Based on the measurement scheme, the ability of the measurement scheme to provide information about a state of the system is quantified. In some embodiments, singular value decomposition is used for quantifying the observability of one or more states.

Figure 1:
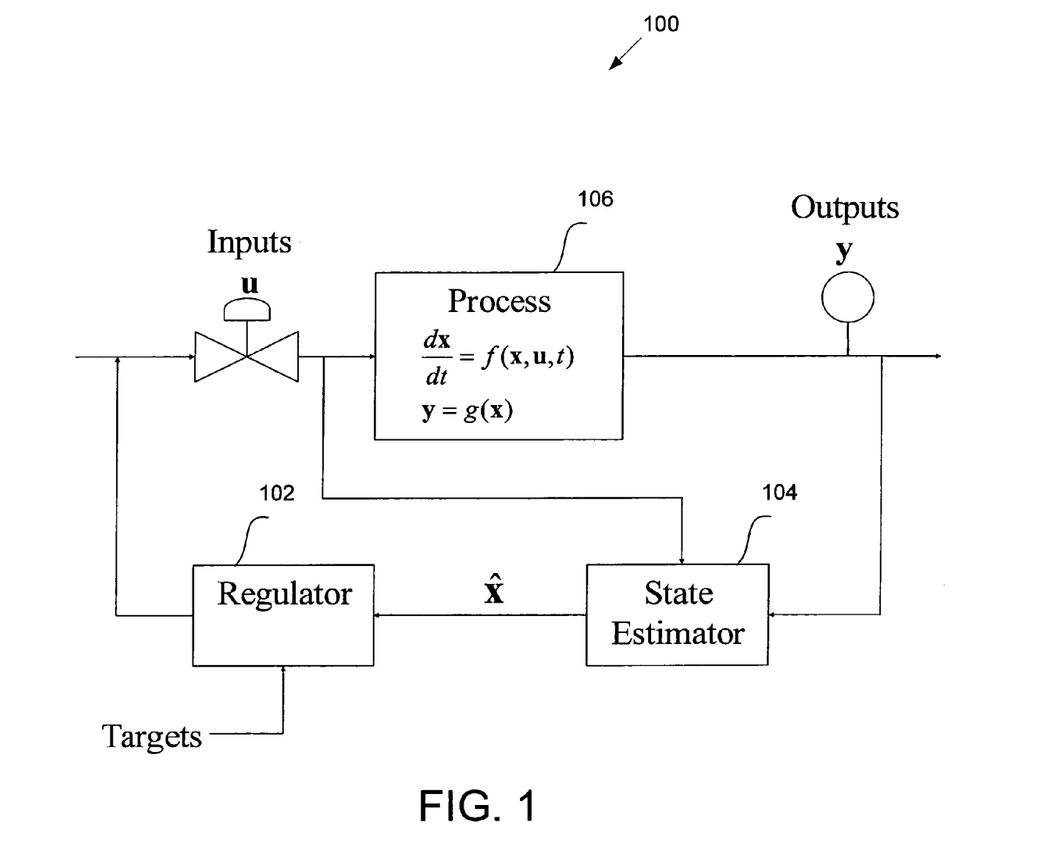
FIG. 1 is a block diagram illustrating an embodiment of a model predictive controller.

FIG. 1 is a block diagram illustrating an embodiment of a model predictive controller. In this example, model predictive controller 100 is used to estimate and regulate a system that implements a process 106. Although a semiconductor manufacturing process and metrology associated with the process are described throughout this specification for purposes of illustration, the technique described is also applicable to other systems implementing different processes.

The controller includes a state estimator 104 and a regulator 102. The state estimator and the regulator may be implemented using hardware (e.g., a processor, a circuitry with a sensor, etc.), software, or a combination. In some embodiments, the estimator and regulator are separate system components. In some embodiments, they are an integral part. System process 106 is modeled using a set of equations based on the input vector u, the output vector y and the state vector x of the system. As used herein, the state vector includes one or more states that characterize the system, such as states that define the optical system, the kinetics of the resist, as well as process disturbances and/or any other appropriate parameters. In some embodiments the states and the inputs may share certain variables, although they are not necessarily equivalent.

In this example, the states are not directly measured but inferred from metrology measurements of the outputs. For purposes of illustration, it is assumed that a state model is known. At each sample time, the state estimator estimates the current system states based on the output y, using the state model. The estimated state vector is denoted as $\hat{x}$. It is further assumed that a desired target state is provided. Regulator 102 varies the system's inputs according to the estimated state and attempts to drive the estimated states to track desired targets, which in turn would result in desired outputs. In the example shown, regulator 102 provides feedback to controller 100 by using the estimated states as the initial starting point. In some embodiments, the regulator determines how much the input parameters are to be varied, and injects the input into the process.

Since the system states cannot be directly measured in some embodiments, one way to solve the state estimation problem is to infer the states from metrology measurements. The state estimation problem refers to finding the most likely values of the states given the measured outputs, the dynamic model of the process, and the measurement sensor. In this example, the state vector x is governed by a dynamic differential equation and the output y is a function, either linear or nonlinear, of the state vector. State estimator 104 is configured to infer, or reconstruct the system states by balancing the contribution made by the process model with the measurements.

Effective state estimation requires that the measured outputs contain information about the states. In other words, the states should be observable from the output measurements. A system is said to be completely observable if given the measurements, all the states are observable. Many systems, however, are only partially observable due to factors such as only certain aspects of the process are measurable, the limitations of the measurement sensors, etc. Process observability is dependent on, among other things, what is measured and where it is measured. As will be shown in more details below, it is possible to quantify the amount of information an output measurement contains about a certain state, allowing the analysis and comparison of the effectiveness of different output measurement schemes.

Figure 2:
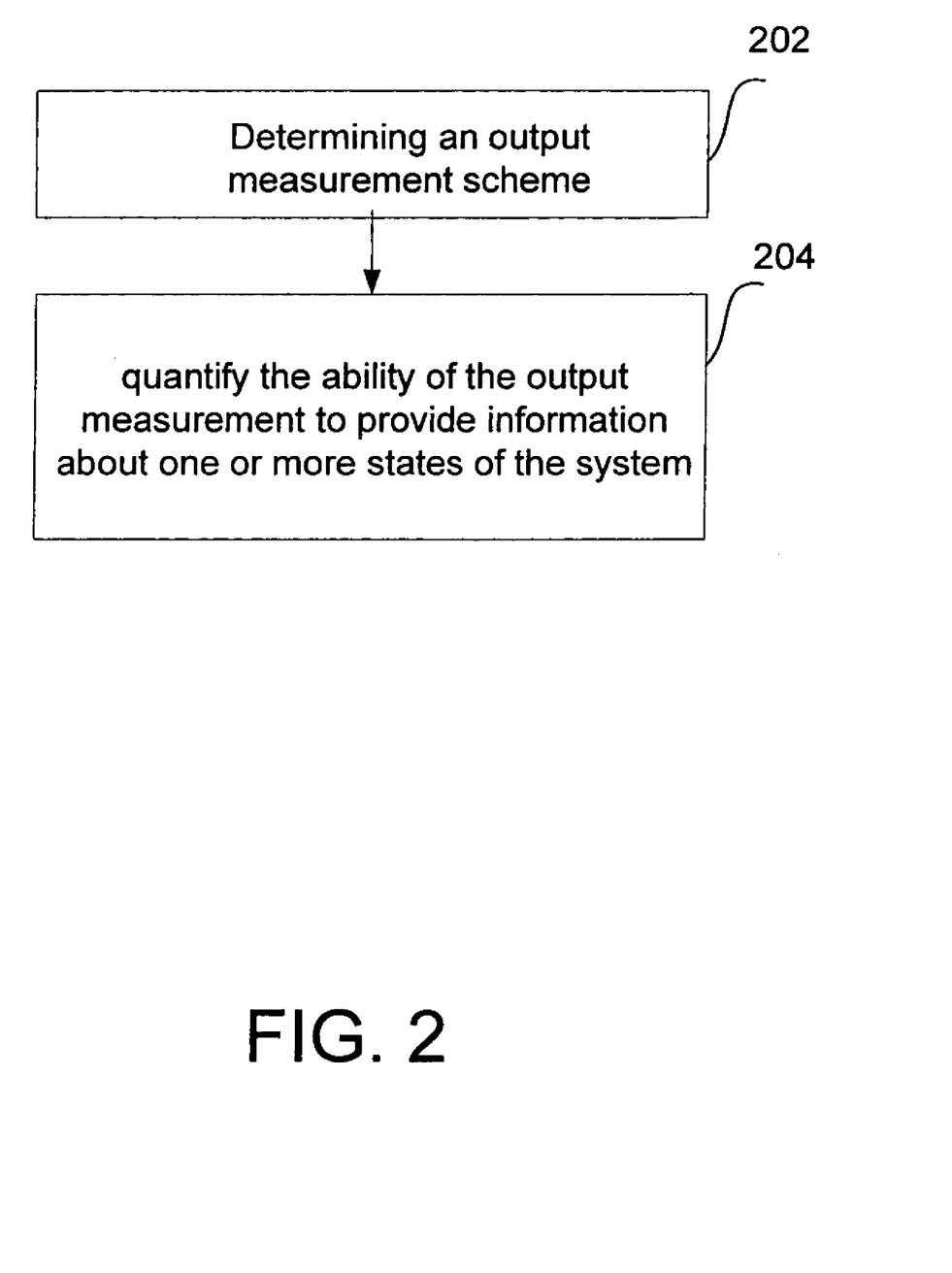
FIG. 2 is a flowchart illustrating an embodiment of a process for evaluating the observability of a system.

FIG. 2 is a flowchart illustrating an embodiment of a process for evaluating the observability of a system. Process 200 may be implemented by, for example, the estimator 104. In this example, an output measurement scheme is determined (202). In some embodiments, the output measurement scheme is determined based on the system model, actual output measurements taken, and/or a variety of other factors. A detailed example of how to determine a measurement scheme is discussed below. The measurement scheme puts the output measurements in context of the system model. Based on the output measurement and the model, the ability of the output measurement to provide information about one or more states of the system is quantified (204).

Figure 3:
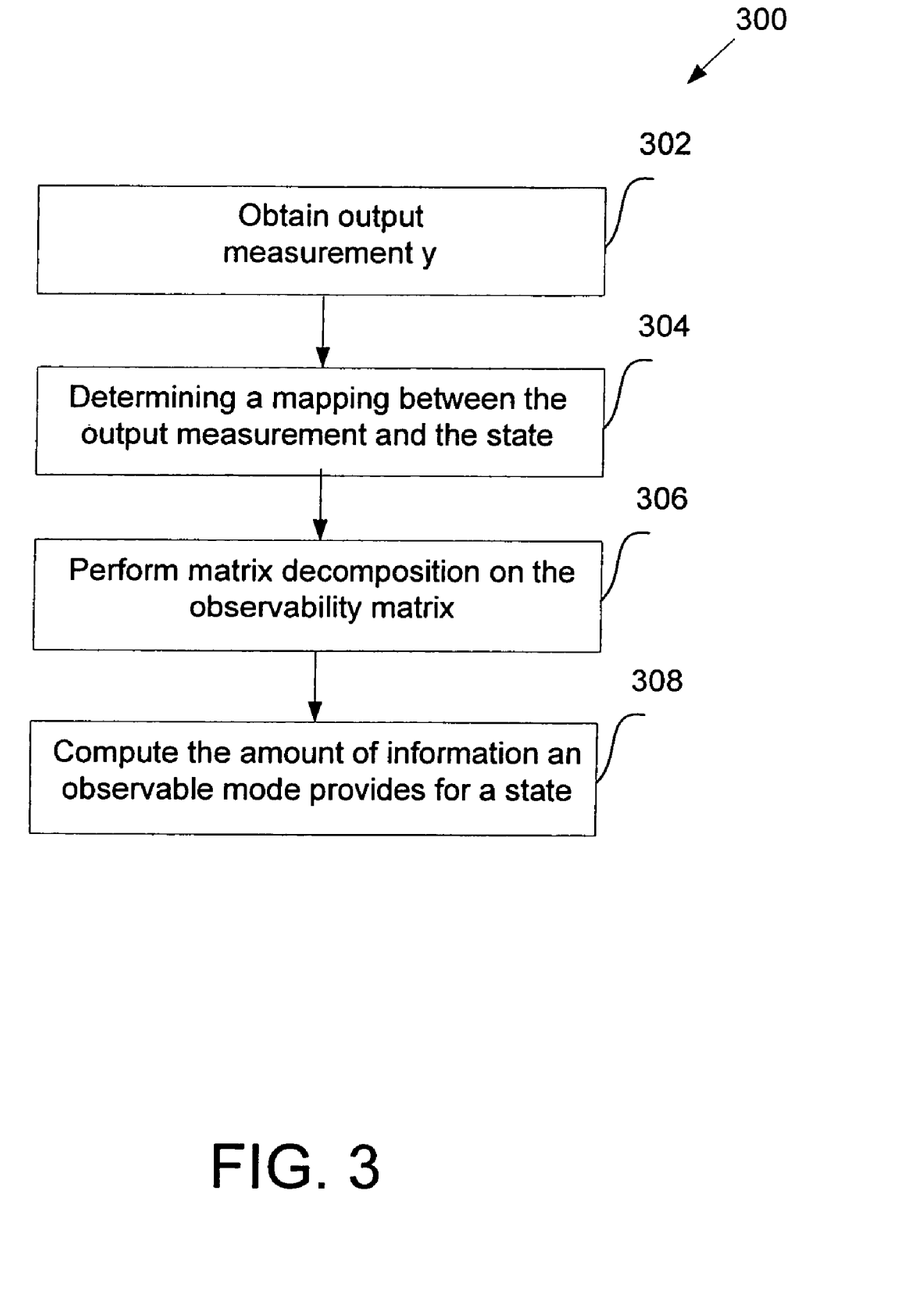
FIG. 3 is a flowchart illustrating another embodiment of a process for evaluating the observability of a system.

FIG. 3 is a flowchart illustrating another embodiment of a process for evaluating the observability of a system. In this example, determining the output measurement scheme includes obtaining one or more output measurements y (302), and determining a mapping between one or more system states and the output measurements (304). The mapping is dependent on the measurement scheme and the system model. Thus, the mapping is affected by factors related to the measurement scheme, such as the choice of sensors, the time, location and frequency of the measurement samples, as well as by factors related to the system model, such as the system fundamentals and empirical measurement data used to construct the model.

In some embodiments, the mapping includes an observability matrix (also referred to as a Grammian matrix) C that maps the states of the system to the measured outputs. For a linear system, the mapping is expressed as:

$$y=Cx$$

If the system states are completely observable, C will be a nonsingular matrix with linearly independent rows and columns, and will have a null space with dimension 0. The solution to the estimation problem is then $$\hat{x}=C^{-1}y$$

If the system states are only partially observable, matrix decomposition is performed to determine how observable each state is (306). In other words, the amount of information an output measurement contains about a state of the system is quantified. In some embodiments, singular value decomposition is used to decompose the observability matrix C to the following form:

$C=USV^T$, where S is a diagonal matrix that includes the singular values of C and has the same dimension as C, U and V are both unitary matrices. The columns of U are referred to as the left singular vectors of C, and the columns of V are referred to as the right singular vectors of C. The singular values and their associated singular vectors characterize matrix C.

By substituting for C, the system equation y=Cx can be rewritten as:

$U^Ty=S(V^Tx)$, where $V^Tx$ is a linear transformation of x. As used herein, linear combinations of the states, such as $V^Tx$, are referred to as modes. Singular value decomposition partitions matrix S according to the relative magnitudes of the singular values, $\tau_i$. In some embodiments, a threshold operation is performed on S. Each $\tau_i$ is compared to a threshold, and any value that is below the threshold is set to zero. Thus, S may include one or more rows having only zeros. An example of S is shown as follows:

$$S = \begin{bmatrix} \sigma_1 & 0 & \cdots & 0 \\ 0 & \sigma_2 & \cdots & 0 \\ \vdots & \vdots & & \vdots \\ 0 & 0 & \cdots & \sigma_n \\ \hline 0 & 0 & \cdots & 0 \\ 0 & 0 & \cdots & 0 \end{bmatrix}$$

The ratio of the largest singular value to the smallest singular value indicates how singular, in other words how invertible, the observability matrix C is. The non-zero rows of S map the modes $V^Tx$ to the observable space and the zero rows of S map the modes to the null space. The rows of $V^T$ that correspond to the non-zero singular values map the state vector to the observable subspace. The number of singular values that are greater than zero is equal to the number of observable modes.

In this example, to quantify the amount of information an observable mode contains about a particular state, the norm of each column of $V^T$ (i.e., the norm of each right singular vector of C) is calculated (308). The computed norm is a value no less than 0 and no greater than 1. The norm indicates how much information the mode provides for a state. A norm of 100% indicates that the given measurement scheme provides all the information that is necessary to determine the particular state.

Process 300 may be repeated for one or more sets of output measurement schemes. Different measurement schemes may result in different norm values. The effectiveness of various measurements schemes can be determined by comparing the results.

FIGS. 4A-4G are diagrams illustrating an example of determining the effectiveness of several different measurement schemes for a system with a cubic model. The model used in this example describes the temperature loss at the edge of the wafer. The model is applicable to processes such as post exposure bake (PEB), chemical vapor deposition (CVD), etch, etc. The model includes four states ($x_1$-$x_4$) that are dependent on the radius of the wafer, expressed as:

$$y = x_1 + x_2 \cdot r + x_3 \cdot r^2 + x_4 \cdot r^3.$$

The state-space form of the model is expressed as:

$$y = Cx,$$

where the size and structure of the matrix C is dependent on the measurements and the system fundamentals. Given the radius r and the measured outputs y, the model can be expressed using the following alternative form:

$$\begin{bmatrix} y_1 \\ y_2 \\ \vdots \\ y_n \end{bmatrix} = \begin{bmatrix} 1 & r_1 & r_1^2 & r_1^3 \\ 1 & r_2 & r_2^2 & r_2^3 \\ \vdots & \vdots & \vdots & \vdots \\ 1 & r_n & r_n^2 & r_n^3 \end{bmatrix} \times \begin{bmatrix} x_1 \\ x_2 \\ x_3 \\ x_4 \end{bmatrix}.$$

The solution to the estimation problem in this example involves finding the four states based on measurements y. The number and the locations of measurements affect the amount of information about the states. The states of the system is determined by computing $C^{-1}y$. If C is invertible, the states will be completely observable (i.e., the estimated states will be equal to the true states). If, however, C is not invertible, the estimated states will likely deviate from the true states because the measurements do not provide sufficient information for describing the states.

Figure 4A:
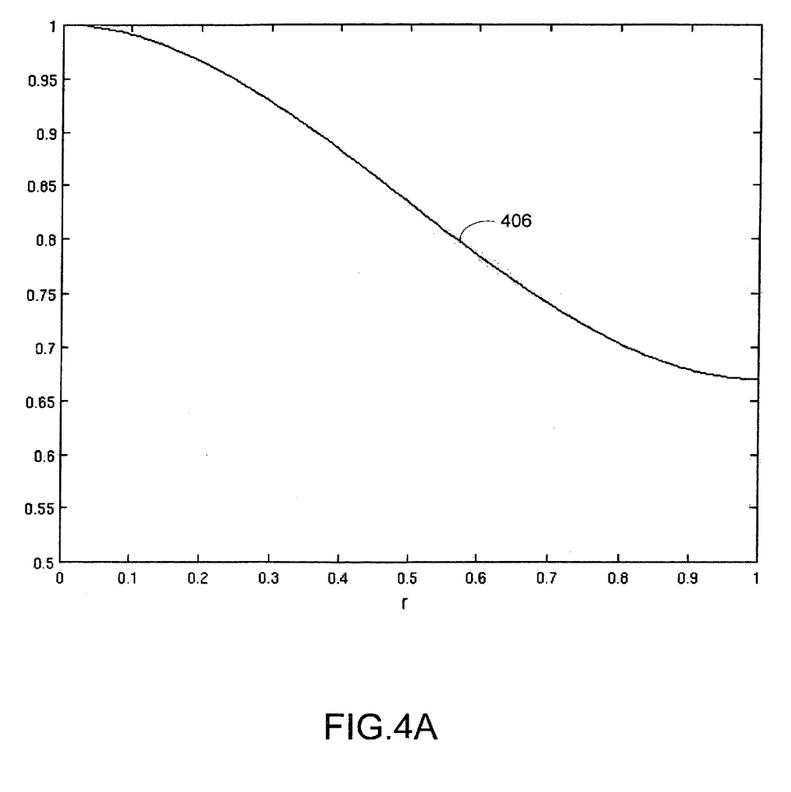
FIGS. 4A-4G are diagrams illustrating an example of determining the effectiveness of several different measurement schemes for a system with a cubic model.
Figure 4B:
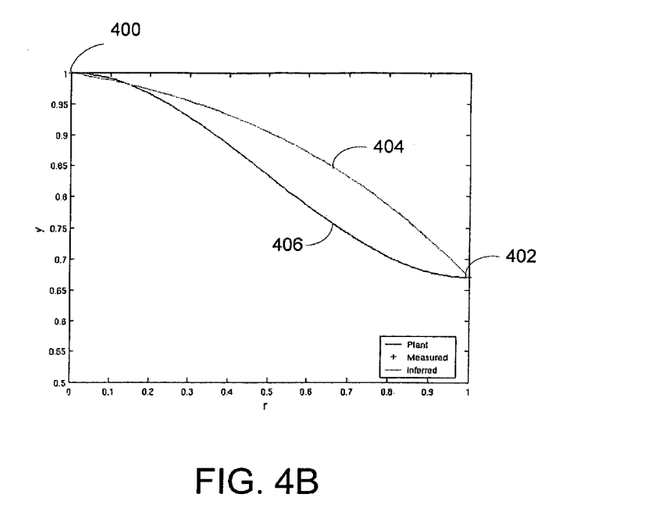
Figure 4C:
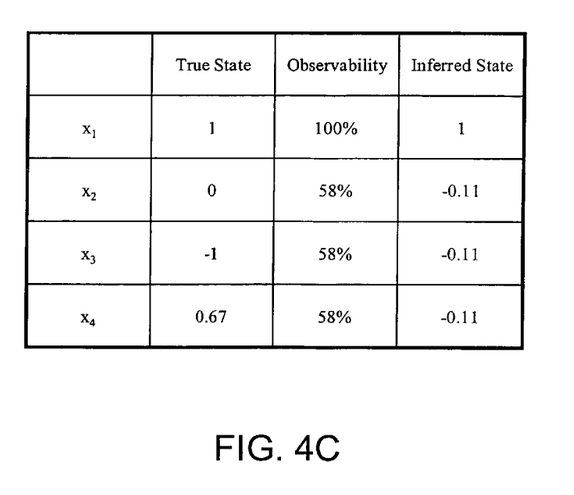

FIG. 4A is a diagram illustrating the true process output 406. FIG. 4B is a diagram illustrating the results of a measurement scheme example. The diagram shows the true process output 406 and a predicted output 404. The predicted output is inferred given the process model and two measurement points (400 and 402) made of the true output. FIG. 4C is a table showing the comparison of the true states and the inferred states based on the measurements. The observability of each state of the system is quantified using previously described processes. The resulting observability values, which do not reach 100% for every state, indicate that the states are not completely observable based on the measurements given. As a result, the inferred output diverges from the true output.

Figure 4D:
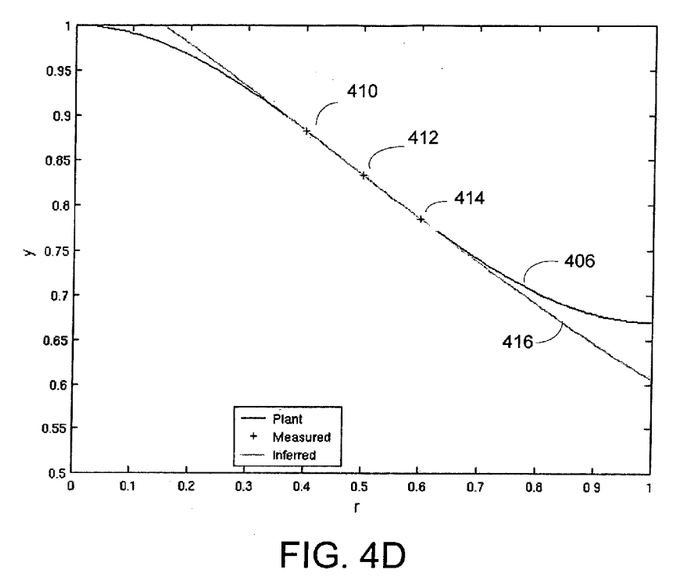
Figure 4E:
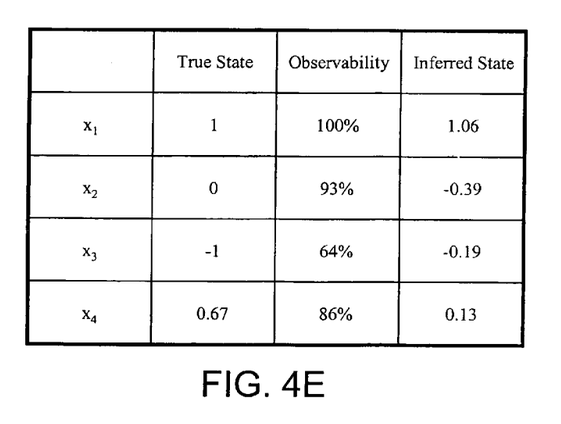

Similarly, FIG. 4D is a diagram illustrating the results of another measurement scheme. The diagram shows the true process output 406, and the predicted output 416 that is inferred given the process model and three measurement points, 410, 412 and 414. FIG. 4E is a table showing the comparison of the true states, the inferred states based on the measurements, and the observability for the states. The observability values indicate that the set of measurements taken in this example provide more information about the states than measurements 400 and 402. As a result, the predicted output more accurately predicts the true output.

Figure 4F:
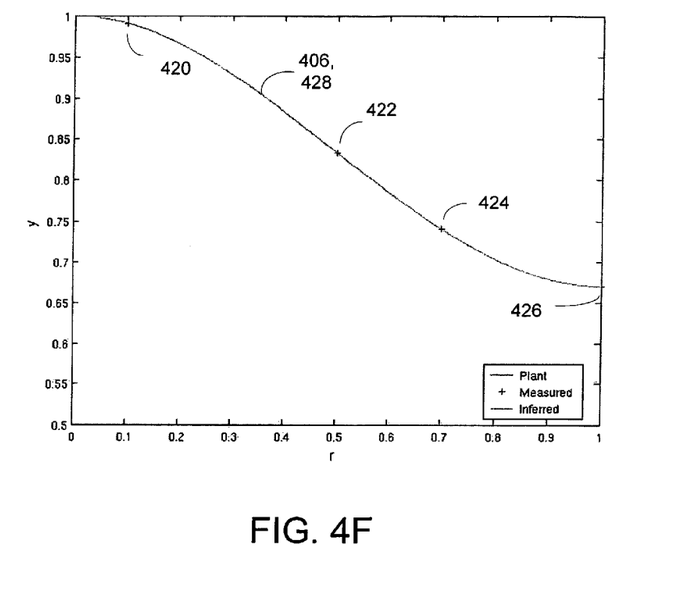
Figure 4G:
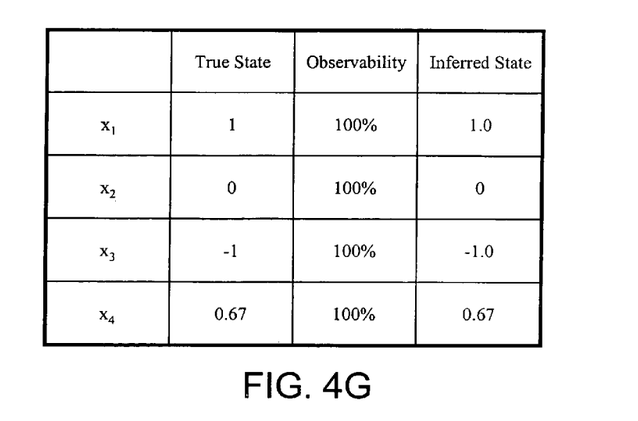

FIG. 4F is a diagram illustrating the results of yet another measurement scheme. The diagram shows the true process output 406 and the predicted output 428 that is inferred given the process model and four measurement points, 420, 422, 424 and 426. FIG. 4G is a table showing the comparison of the true states, the inferred states based on the measurement, and the observability values are 100% for all the states, indicating that the states are completely observable given this set of measurements. As a result, the predicted output perfectly predicts the true output.

Figure 5A:
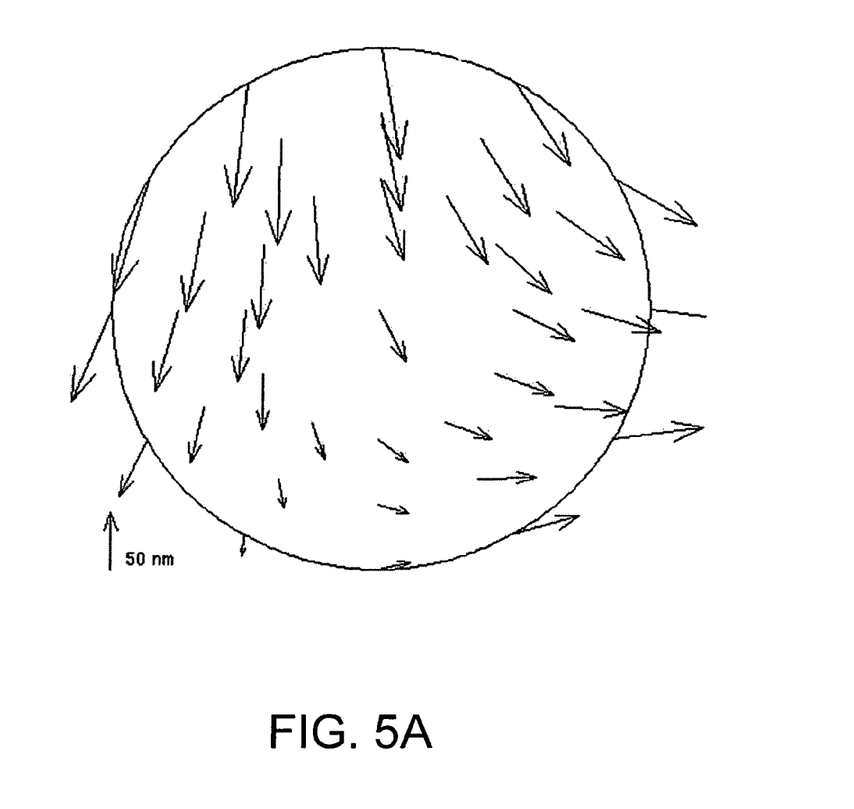
Figure 5B:
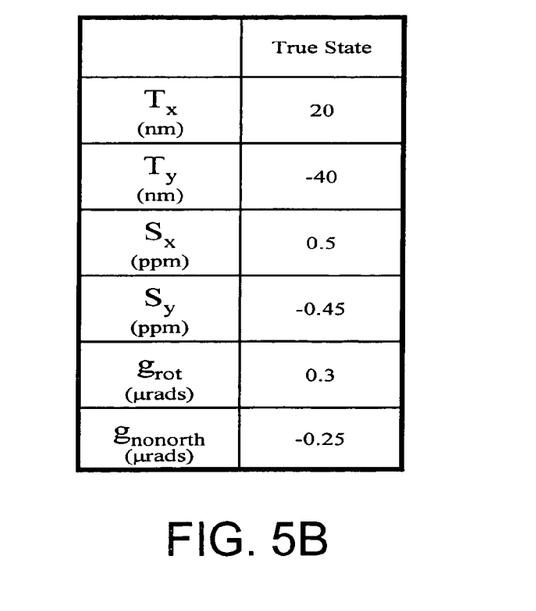
Figure 5C:
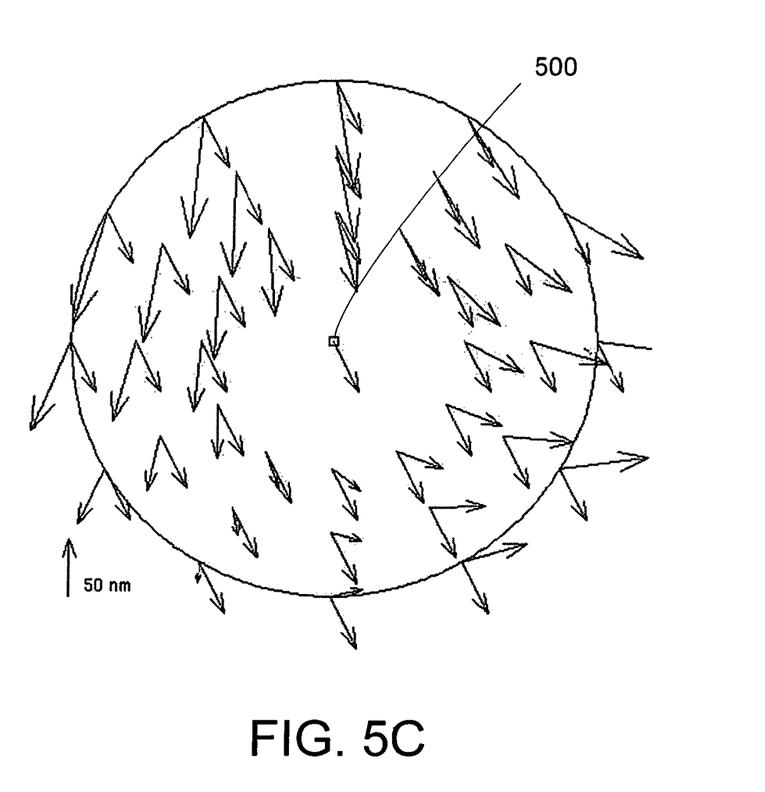
Figure 5D:
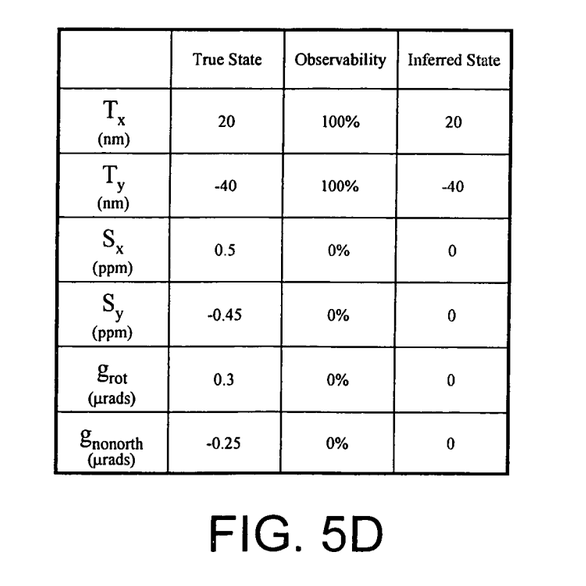

FIGS. 5A-5K illustrate another example of evaluating observability based on various measurement schemes. FIG. 5A is a diagram illustrating a wafer under process by an overlay system. The arrows indicate the outputs at various locations on the wafer. FIG. 5B is a table showing the true states of the system. The states include x-translation (Tx), y-translation (Ty), scale-x (Sx), scale-y (Sy), grid rotation (Grot), and grid non-orthogonal rotation (Gnon-orth). In FIG. 5C, a single measurement point is taken at 500. In addition to the actual outputs, the inferred outputs are shown as a second set of arrows. FIG. 5D is a table showing the true states, the inferred states, and the observability associated with each state. The observability values indicate that the states are not completely observable based on the measurements given.

Figure 5E:
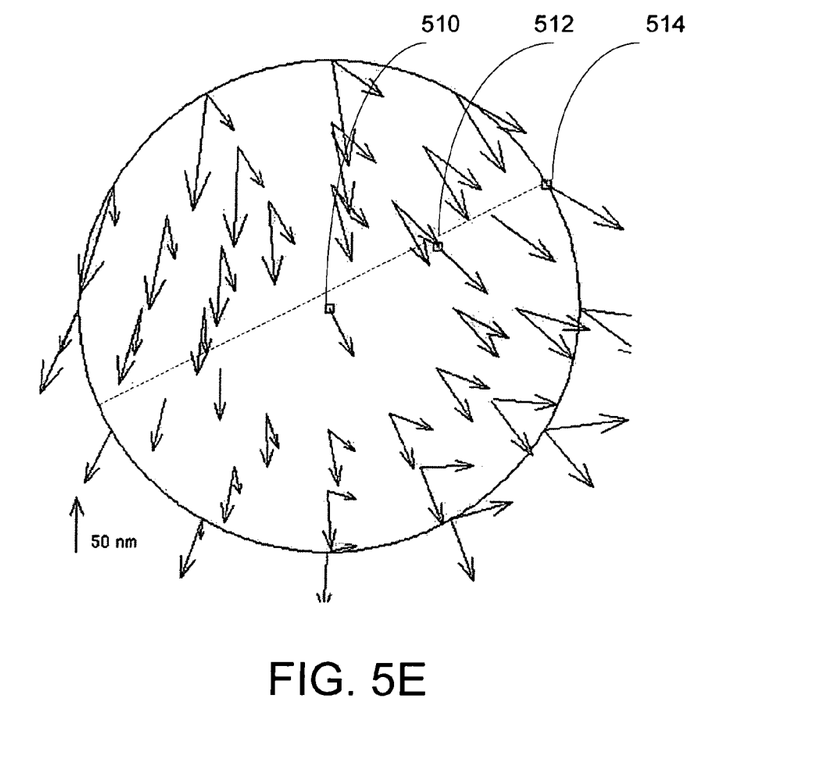
Figure 5F:
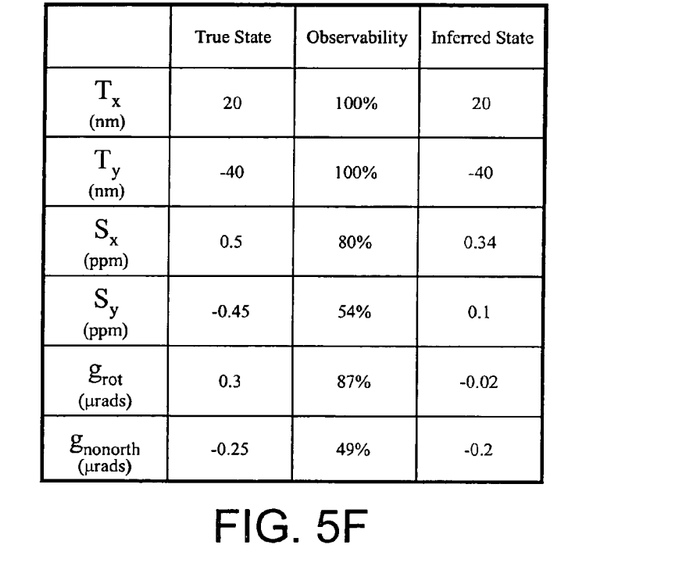

The wafer shown in FIG. 5E has three measurement points at 510, 512 and 514. Two sets of arrows show the actual outputs and the extrapolated outputs at various other locations on the wafer. FIG. 5F is a table showing the true states, the inferred states, and the observability associated with each state. The observability values are greater or equal to the corresponding values shown in FIG. 5D. Thus, the three measurements in this example provide more information regarding the states than the previous measurement.

Figure 5G:
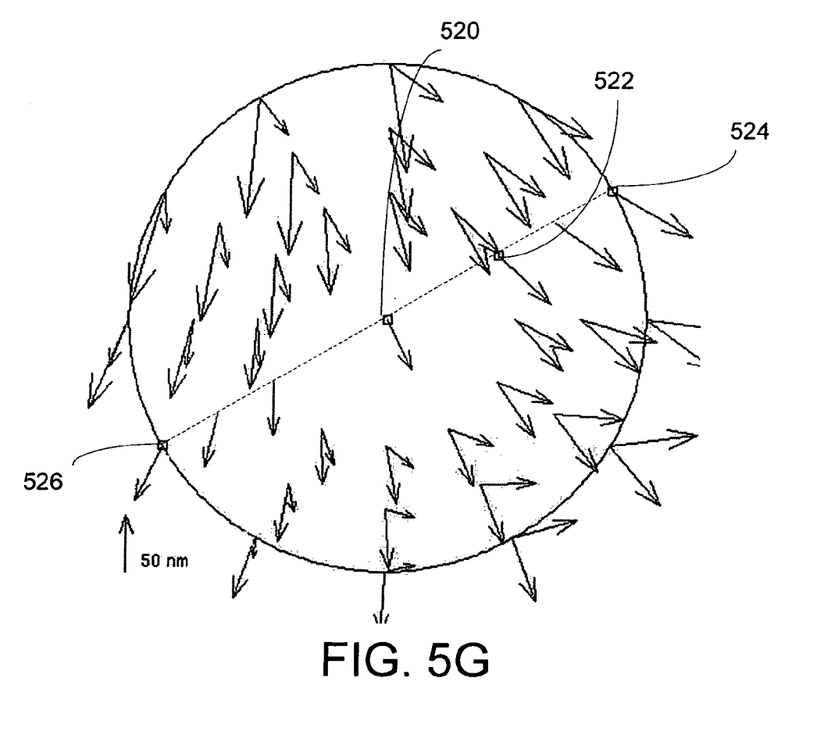
Figure 5H:
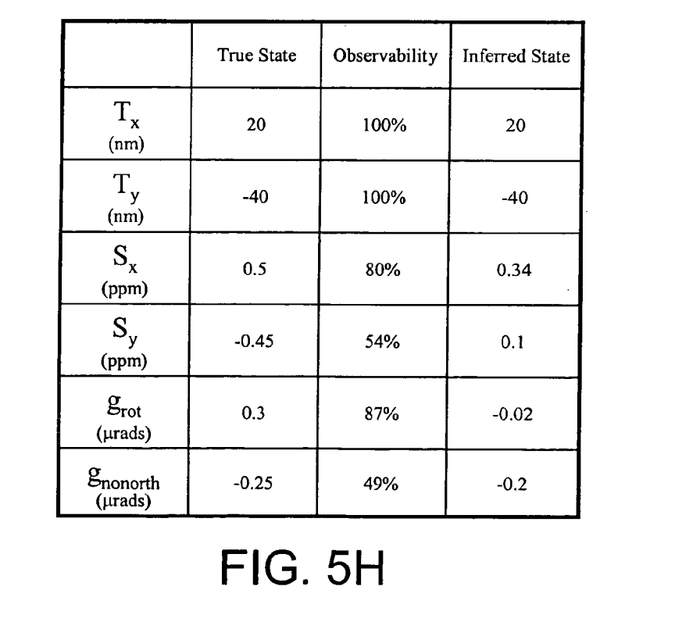
Figure 5J:
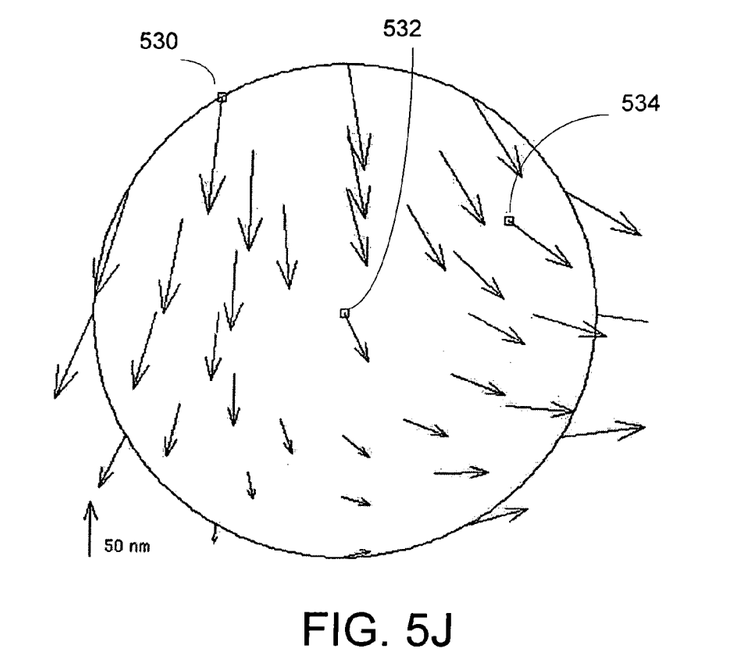
Figure 5K:
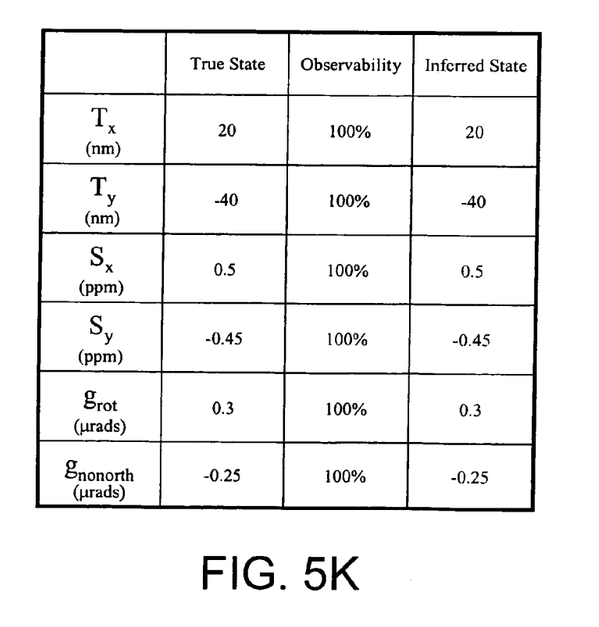

FIG. 5G illustrates yet another set of measurement points, 520, 522, 524 and 526. As shown in FIG. 5H, the measurements provide the same amount of observability as the set of three measurements shown in FIGS. 5E-5F. This result may be explained by the fact that the measurements in both cases are taken along the same line on the wafer, thus providing redundant information regarding the states. In FIGS. 5J-5K, the system is shown to be completely observable based on three data points 530, 532 and 534. The comparison of the measurements indicate that of the measurement schemes used, FIG. 5J provides the most information with the smallest number of measurements.

Quantification of the observability of various measurement schemes is used in some embodiments to improve the estimator design. As illustrated in the examples above, comparing the observability gives insight into the selection of measurement locations. Other considerations affecting the measurements may also be compared by using the observability values. For example, in some embodiments, the observability of measurement schemes using different types of sensors is quantified. The observability values give indication of how well different types of sensors perform. Comparison of the observability is made to select suitable sensors for the estimator.

The examples shown above have linear system models. The techniques described are also applicable to nonlinear systems where the relationship between the states and output measurements are described using a nonlinear model. The model is approximated using a Taylor series, which provides a linear approximation of the model. Process such as 300 is applied to determine the observability of states given the linear approximation of the system model.

Evaluating the observability of a system has been disclosed. Using a matrix transformation of the observability matrix to quantify the observability of states provides a way to better design and implement metrology measurements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of evaluating the observability of a system, comprising:
    determining an output measurement scheme;
    determining a mapping between a state of the system and a measured output of the system;
    determining an observability matrix using a plurality of mappings between states of the system and measured outputs of the system;
    performing singular value decomposition on the observability matrix to determine a right singular vector of the observability matrix;
    determining a norm of the right singular vector;
    quantifying an ability of the output measurement scheme to provide information about a state of the system by using the norm; and
    conveying the ability of the output measurement scheme as an observability measurement.

2. A method as recited in claim 1, wherein determining the output measurement scheme includes providing a sensor model.

3. A method as recited in claim 1, wherein quantifying the ability of the output measurement scheme to provide information about a state of the system includes:
    performing a threshold operation on the diagonal matrix.

4. A method as recited in claim 1, wherein the norm is a percentage value indicating the observability of the state.

5. A method as recited in claim 1, wherein the system includes a semiconductor processing system.

6. A method as recited in claim 1, wherein the output measurement is a first output measurement obtained via a first measurement scheme; the method further comprising:
    obtaining a second output measurement using a second measurement scheme;
    placing the second output measurement scheme in context of the model;
    based on the second output measurement and the model, quantifying the ability of the second output measurement to provide information about the state of the system; and
    comparing the ability of the first output measurement scheme to provide information about the system with the ability of the second output measurement to provide information about the state of the system.

7. A method as recited in claim 1, wherein the system includes a nonlinear model.

8. A state estimator for evaluating the observability of a system, comprising:
    a processor configured to:
        determine an output measurement scheme;
        determine a mapping between a state of the system and a measured output of the system;
        determine an observability matrix using a plurality of mappings between states of the system and measured outputs of the system;
        perform singular value decomposition on the observability matrix to determine a right singular vector of the observability matrix;
        determine a norm of the right singular vector;
        quantify an ability of the output measurement scheme to provide information about a state of the system by using the norm; and
        convey the ability of the output measurement scheme as an observability measurement; and
    a memory coupled to the processor, configured to provide the processor with instructions and to store the observability measurement.

9. A state estimator as recited in claim 8, wherein to determine the output measurement scheme comprises providing a sensor model.

10. A computer program product for evaluating the observability of a system, the computer program product being embodied in a computer readable medium and comprising computer instructions for:
    determining an output measurement scheme;
    determining a mapping between a state of the system and a measured output of the system;
    determining an observability matrix using a plurality of mappings between states of the system and measured outputs of the system;
    performing singular value decomposition on the observability matrix to determine a right singular vector of the observability matrix;
    determining a norm of the right singular vector;
    quantifying an ability of the output measurement scheme to provide information about a state of the system by using the norm; and
    conveying the ability of the output measurement scheme as an observability measurement.

11. A computer program as recited in claim 10, wherein the output measurement is a first output measurement obtained via a first measurement scheme; the method further comprising:
    obtaining a second output measurement using a second measurement scheme;
    placing the second output measurement scheme in context of the model;
    based on the second output measurement and the model, quantifying the ability of the second output measurement to provide information about the state of the system; and
    comparing the ability of the first output measurement scheme to provide information about the system with the ability of the second output measurement to provide information about the state of the system.

* * * * *